May 2, 1961 D. B. ELMORE 2,981,973
METHODS OF FORMING FOOD PATTIES
Filed Jan. 31, 1958 2 Sheets-Sheet 1

INVENTOR.
DANIEL B. ELMORE
BY
ATTORNEY

PRESSING SHEET MATERIAL INTO
CASING TO FORM LINING.

INSERTING FOOD MATERIAL.

APPLYING UPPER SHEET AND
COMPACTING FOOD MATERIAL
INTO PATTY.

SHAVING OFF EXCESS PORTION
OF PATTY ABOVE CASING.

INVENTOR.
DANIEL B. ELMORE
BY
Knox & Knox

United States Patent Office 2,981,973
Patented May 2, 1961

2,981,973

METHODS OF FORMING FOOD PATTIES

Daniel B. Elmore, San Diego, Calif., assignor to Zenda Radio & Electric Company, San Diego, Calif., a firm Filed Jan. 31, 1958, Ser. No. 712,362

2 Claims. (Cl. 17—45)

My invention relates to methods of forming food patties, before or after cooking, but more particularly as shaped for storage in deep freezers or other types of refrigeration, in preparation for cooking; and its principal object is through the employment of a shallow casing, open top and bottom, and through the use of strips of sheet material manually applied simultaneously to the unformed mass of the material above and below, to compress and compact therebetween the said mass against the walls of the casing, and into the form desired.

Another object of the invention is to provide an inexpensive and efficient means of forming food patties of different sizes, each of which is of uniform shape, in order to assure the serving of appropriate portions to those who are sharing the meal.

A further object of this invention is to provide the inexperienced housewife means for the production of food patties in which the possibility of error as to the needed time for cooking the patty is guarded against and practically eliminated.

Attention is hereby directed to the accompanying drawing illustrating the employment of one set of articles used by me in the carrying out of my improved method of forming food patties, in which drawing similar numerals of designation refer to similar parts throughout the several views, and in which, Fig. 1 is an exploded isometric view of the shallow casing, open top and bottom, and the strips of sheet material used by me in the exercise of my improved method of forming food patties, showing the relation of said parts to the unformed mass of the patty at the beginning of said operation;

Figure 1:
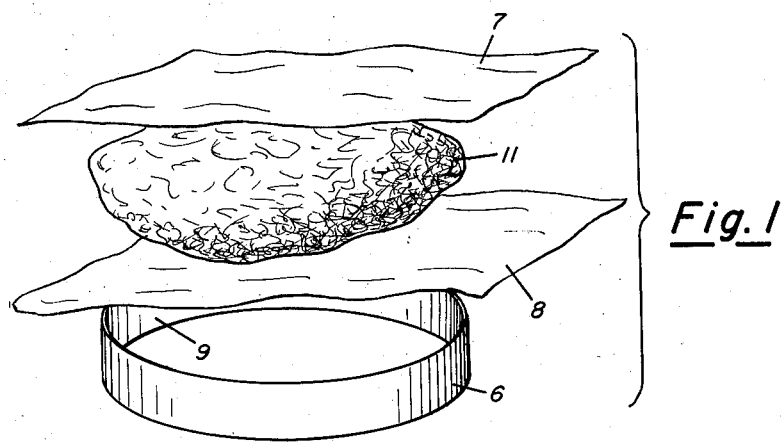
Figure 4:
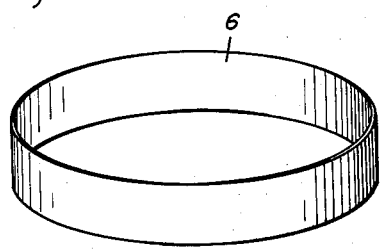
Fig. 4 is an isometric view of said shallow casing.
Figure 2:
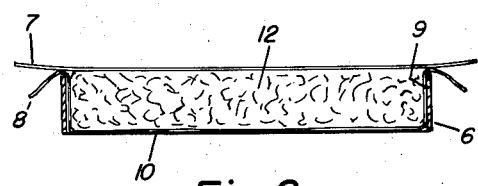
Fig. 2 is a vertical section through the said parts and food patty, at the time of their final assembly, and the processed formation of the patty.
Figure 5:
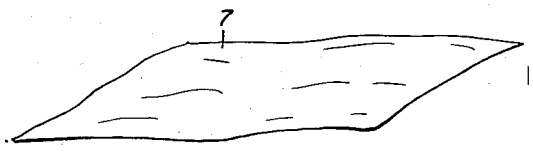
Fig. 5 is an isometric view of one of said strips of sheet material.

Referring to the drawing, the casing 6, open top and bottom, is here shown in the form of a shallow cylindrical box; but may be triangular, square, rectangular, hexagonal, or any other shape suitable for the molding of the patty. It is low in height to conform to the desired thickness of the patty, and it may be made of metal, plastic or other suitable material. The walls of the casing are smooth and preferably perpendicular, but may be inclined to facilitate the removal of the patty.

The strips 7 and 8 are of flexible sheet material, preferable waterproof or non-absorptive of liquids, and are of sufficient size to cover and extend substantially beyond the top and bottom openings of the casing 6; the strip 8 being designed to form a lining 9, closely contacting the adjacent inner surface of the wall of the casing, and to form a flat bottom 10, therefor, and the strip 7 is of sufficient size and extent to form a flat cover for the casing and to overlap the same.

Figure 3:
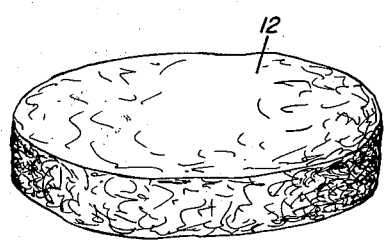
Fig. 3 is an isometric view of the patty as finally formed and removed from said casing and separated from the strips of sheet material.
Figure 6:
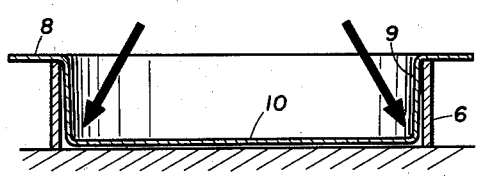
Figs. 6, 7, 8 and 9 are sectional views illustrating the steps of the method of forming patties.
Figure 7:
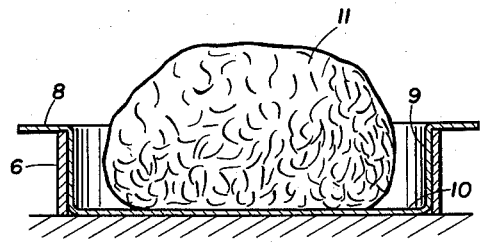
Figure 8:
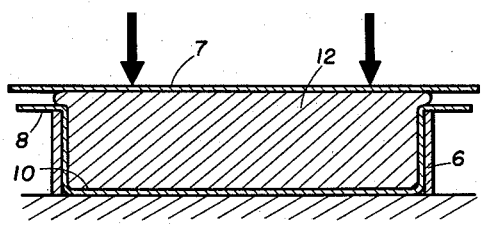
Figure 9:
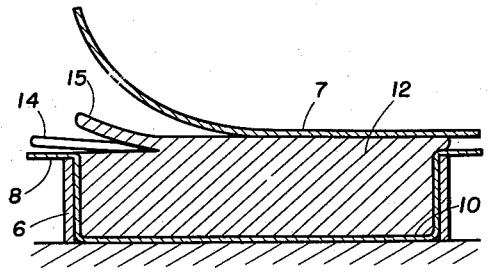

To form the patty 11, I first seat the casing upon the level top of a table, or other convenient flat surface available for the purpose, and thereupon extending over said strip 8. I manually force and manipulate the said strip downwardly within such casing and closely against the adjacent encircling wall thereof, and shape said strip to form the close fitting lining 9 of said casing, the middle portion of said strip temporarily constituting a flat bottom 10 of the casing. Thereafter, I separate from a food patty supply or store of such provision a mass which I estimate to be slightly larger than the content of said casing, and introduce such mass within the lining of said casing, and then applying the strip 7 to the top of said mass I manually and uniformly press said strip downwardly to compact and to force the mass 11 firmly against the lining 9 and bottom 10 of said casing, until the casing is completely filled with said mass, and to a small extent overflowing the same; at which time I raise and separate the strip 7 from the patty 12 so formed, and with a knife or spatula shave off, if desired, the top of the patty to the level of the top walls of the casing. Then, by manually pressing upward through the casing the bottom 10 of the lining 9, the patty so compressed, is evacuated therefrom, and upon the careful removal of said lining from said patty is complete, with the formation of the patty as disclosed in Fig. 3.

As a variation of said manner of forming the patty, I also make the same by first applying the bottom piece 8 of sheet material to the broad surface of any object convenient for the purpose such as an ironing board, kitchen leaf or ledge, or even the lap of an apron, and upon the face of said bottom strip I rest the said open casing 6. I thereupon separate from the mass of food material a portion of suitable size for use as a patty, and I pack the same within the hollow of the casing, and, employing the top piece 7 of sheet material applied to the top of said mass, I manually compress said mass downwardly against said bottom strip 8 and against the walls of the casing 6 until the patty is molded into the form desired. Thereafter, I remove the top and bottom strips 7 and 8 from the patty so formed and carefully evacuate the same from the casing 6.

Also, in the cooking of said patty, where the same has been shaped between the two sheets of sheet material and evacuated so enclosed from the casing as hereinbefore described, I preferably first remove the upper piece of sheet material from the patty, and then turning the patty upside down, while contained in the lower piece of material, I place the exposed face of the patty upon the frying pan, and cook the same to the degree desired; thereafter removing the lower piece of sheet material.

My invention may be embodied in other specific forms without departing from the spirit or essential characteristics thereof. The present embodiment as above set forth is therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. A method of forming food patties employing a shallow casing, open top and bottom, comprising the seating of said casing upon a flat surface, then applying a piece of sheet material, larger than said casing, to the top of said casing and pressing the same downwardly onto the inner surface of the wall of said casing to form a lining therefor and the bottom thereof and with edge portions of the sheet material extending beyond the top edge of the casing; thereupon introducing into the hollow of said lining so formed a mass of food material; then manually applying another piece of sheet material to the top of said mass and forcing said mass against said lining and bottom to compact the body of the mass into the form of a patty; and thereafter manually removing said casing from said patty enclosed by said sheets.

2. A method of forming food patties employing a shallow casing, open top and bottom, comprising the seating of said casing upon a flat surface, then applying a piece of sheet material, larger than said casing, to the top of said casing and pressing the same downwardly onto the inner surface of the wall of said casing to form a lining therefor and the bottom thereof and with edge portions of the sheet material extending beyond the top edge of the casing; thereupon introducing into the hollow of said lining so formed a mass of food material loosely to fill and overflow the same; then manually applying another piece of sheet material to the top of said mass and forcing said mass against said lining and bottom to compact the body of the mass into the form of a patty then removing the upper piece of sheet material and shaving off the top of the patty to the level of the top of the wall of said casing; and thereafter manually removing said casing from said patty enclosed by the lower piece of sheet material.

References Cited in the file of this patent

UNITED STATES PATENTS

| | | |
|---|---|---|
| 1,757,447 | Comstock | May 6, 1930 |
| 1,902,760 | Chase | Mar. 21, 1933 |
| 2,081,455 | Holly | May 25, 1937 |
| 2,260,780 | Holly | Oct. 28, 1941 |
| 2,373,781 | Richardson | Apr. 17, 1945 |
| 2,527,919 | Drangle | Oct. 31, 1950 |
| 2,574,831 | Jameson et al. | Nov. 13, 1951 |
| 2,641,094 | Starzyk | June 9, 1953 |